United States Patent
Zichettello et al.

(10) Patent No.: US 9,079,475 B1
(45) Date of Patent: Jul. 14, 2015

(54) PANORAMIC SUNROOF ASSEMBLY (71) Applicant: Honda Motor Co., Ltd., Tokyo (JP)

(72) Inventors: Alexander James Zichettello, Hilliard, OH (US); Brent Nathaniel Gaertner, Cable, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/278,056

(22) Filed: May 15, 2014

(51) Int. Cl.
B60J 7/043 (2006.01)
B60J 7/00 (2006.01)
B60J 7/057 (2006.01)

(52) U.S. Cl.
CPC ............... *B60J 7/0435* (2013.01); *B60J 7/003* (2013.01); *B60J 7/0084* (2013.01); *B60J 7/0573* (2013.01)

(58) Field of Classification Search
CPC ...... B60J 7/0084; B60J 7/0007; B60J 7/0015; B60J 7/003; B60J 7/057; B60J 7/0573; B60J 7/0038
USPC .............................. 296/216.01–224, 213, 214
See application file for complete search history.

(56) References Cited

U.S. PATENT DOCUMENTS

| 4,844,532 | A | 7/1989 | Ono et al. |
| 4,844,535 | A | 7/1989 | Farmont |
| 5,466,038 | A | 11/1995 | Fujie et al. |
| 5,902,008 | A * | 5/1999 | Butsuen et al. ............... 296/213 |
| 6,065,801 | A | 5/2000 | Kawamura et al. |
| 6,409,259 | B1 | 6/2002 | Patelczyk et al. |
| 6,582,014 | B1 * | 6/2003 | Racine et al. ................. 296/223 |
| 6,644,728 | B1 | 11/2003 | Nagashima et al. |
| 7,798,567 | B2 | 9/2010 | Glasl et al. |
| 8,282,157 | B2 * | 10/2012 | Kato et al. ..................... 296/214 |
| 8,562,070 | B2 | 10/2013 | Weyl et al. |
| 2001/0028182 | A1 * | 10/2001 | Tsuruo et al. ................. 296/223 |
| 2004/0041442 | A1 * | 3/2004 | Cooney et al. ........... 296/216.08 |
| 2010/0038932 | A1 | 2/2010 | Comfort et al. |
| 2013/0088052 | A1 | 4/2013 | Nellen |
| 2013/0285418 | A1 | 10/2013 | Katayama et al. |

FOREIGN PATENT DOCUMENTS

KR 2002081864 * 10/2002

* cited by examiner

*Primary Examiner* — Dennis H Pedder
(74) *Attorney, Agent, or Firm* — Rankin, Hill & Clark LLP (57) ABSTRACT

A panoramic sunroof assembly includes a roof structure having a pair of side rails fixed thereto. A first sunroof panel covers a first opening of the roof structure, and a second sunroof panel covers a second opening of the roof structure. A sunshade assembly includes a frame mounted to the roof structure and a slidable sunshade panel for blocking light entering the second opening. The frame is configured to retain a drain tube of a drainage assembly thereto to prevent damage to the drain tube during install of the sunshade assembly on the roof structure and enable optimal daylight open size and position of the second opening. One of the side rails is configured to route a motor drive cord of a sunshade panel drive mechanism both above and below the one side rail at a predetermined location on the one side rail.

17 Claims, 6 Drawing Sheets

PANORAMIC SUNROOF ASSEMBLY

BACKGROUND

Vehicles typically include a panoramic sunroof assembly which offers an open feeling to the vehicle occupants by providing a glass sunroof panel along most of the roof panel including the front seat portion as well as the rear seat portion. To protect from sunlight shining through the sunroof panel, the panoramic sunroof assembly is traditionally provided with a sunshade assembly including a sunshade panel to selectively cover or uncover the sunroof panel. The sunshade panel is typically held on both sides in the vehicle interior and is displaceable in the vehicle longitudinal direction by winding or unwinding a roller that is disposed at an end of the roof panel. Rain gutters can also be provided along the sides of the sunroof panel. The gutters receive rainwater or washing water coming from between the peripheral edge of a sunroof opening and the sunroof panel and guide the water to drain conduits. The panoramic sunroof assembly can further include separate operating devices for moving the sunroof panel and the sunshade panel. Accordingly, the layout for the various components of the panoramic sunroof assembly can be complicated.

BRIEF DESCRIPTION

In accordance with one aspect, a panoramic sunroof assembly for a vehicle comprises a roof structure including a pair of laterally spaced side rails fixed to the roof structure. The roof structure has a forward part defining a first opening and a rearward part defining a second opening. A first sunroof panel is slidably connected to the roof structure for covering the first opening, and a second sunroof panel is connected to the roof structure for covering the second opening. A sunshade assembly includes a frame separate from and mounted to the roof structure and a sunshade panel slidably connected to the frame for selectively blocking light entering the second opening. A drainage assembly is associated with the first opening. The drainage assembly includes a pair of laterally spaced drain conduits connected to the side rails and a drain tube interconnecting the drain conduits. The frame of the sunshade assembly is configured to retain the drain tube thereto to prevent damage to the drain tube during install of the sunshade assembly on the roof structure and enable optimal daylight open size and position of the second opening.

In accordance with another aspect, a panoramic sunroof assembly for a vehicle comprises a roof structure including a pair of laterally spaced side rails fixed to the roof structure. The roof structure has a forward part defining a first opening and a rearward part defining a second opening. A first sunroof panel is slidably connected to the roof structure for covering the first opening, and a second sunroof panel is connected to the roof structure for covering the second opening. A sunshade assembly includes a frame mounted to the roof structure. A sunshade panel is slidably connected to the frame for selectively blocking light entering the second opening. A drive mechanism moves the sunshade panel between a closed position and an opened position. The drive mechanism includes a motor drive cord extending along one of the side rails. The one side rail includes a pair of longitudinally spaced slots angled toward one another and sized to receive and retain therein the motor drive cord. The slots allow the motor drive cord to be routed both above and below the one side rail at a predetermined location on the one side rail.

In accordance with yet another aspect, a panoramic sunroof assembly for a vehicle comprises a roof structure including a pair of laterally spaced side rails fixed to the roof structure. The roof structure has a forward part defining a first opening and a rearward part defining a second opening. A first sunroof panel is slidably connected to the roof structure for covering the first opening, and a second sunroof panel is connected to the roof structure for covering the second opening. A sunshade assembly includes a frame mounted to the roof structure. A sunshade panel is slidably connected to the frame for selectively blocking light entering the second opening. The frame includes a front frame part configured to at least partially secure thereto a drain tube of a drainage assembly associated with the first opening. A drive mechanism moves the sunshade panel between a closed position and an opened position. The drive mechanism includes a motor drive cord extending along one of the side rails. The one side rail is configured to route the motor drive cord both above and below the one side rail at a predetermined location on the one side rail.

DETAILED DESCRIPTION

It should, of course, be understood that the description and drawings herein are merely illustrative and that various modifications and changes can be made in the structures disclosed without departing from the present disclosure. In general, the figures of the exemplary panoramic sunroof assembly are not to scale. As used herein, lateral directions are transverse across the vehicle, i.e., left and right directions. Likewise, longitudinal directions refer to forward and rearward directions of vehicle travel, and the vertical directions relate to elevation, i.e., upward and downward directions. It will also be appreciated that the various identified components of the exemplary panoramic sunroof assembly disclosed herein are merely terms of art that may vary from one manufacturer to another and should not be deemed to limit the present disclosure.

Figure 1:
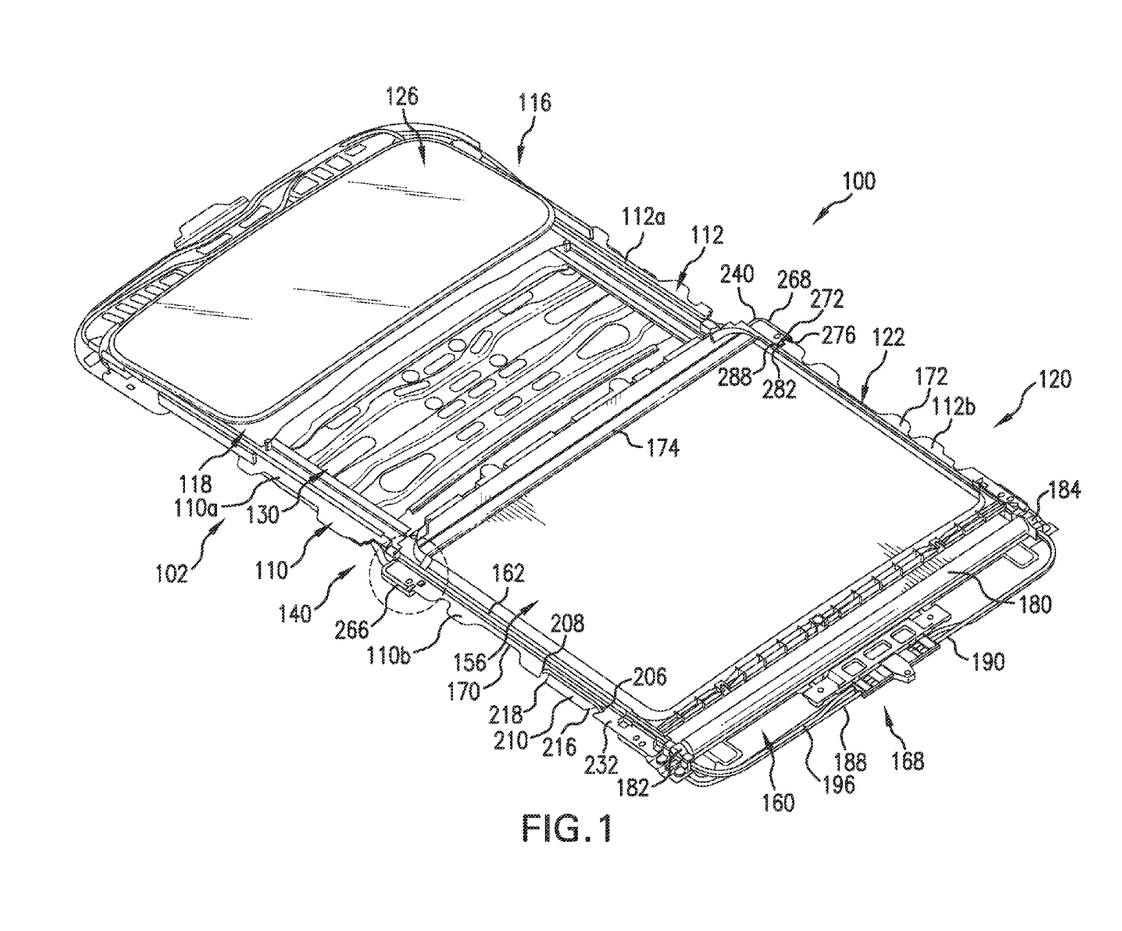
FIG. 1 is a top perspective view of a panoramic roof assembly.

Referring now to the drawings, wherein like numerals refer to like parts throughout the several views, FIGS. 1-6 illustrate a panoramic sunroof assembly 100 according to the present disclosure. The exemplary panoramic sunroof assembly 100 comprises a roof structure 102 overlying a roof panel 104 (FIG. 2) for covering an opening of a fixed roof of a vehicle (not shown). A pair of laterally spaced, longitudinally extending side rails 110, 112 is fixed to the roof structure 102. The roof structure 102 has a forward part 116 defining a first opening 118 through the roof structure and a rearward part 120 defining a second opening 122 through the roof structure. In the depicted embodiment, a first sunroof panel 126 is connected to the roof structure 102 for covering the first opening 118. As is well known, the first sunroof panel 126 can be movable from a closed position shown in FIG. 1 to an opened position where the first sunroof panel 126 is slid by a tilt-and-slide mechanism (to be generally described below)

rearward over a section 130 of the roof structure 102 located between the first and second openings 118, 122.

As depicted in FIG. 1, the side rails 110, 112, which can be laterally symmetrical, extend the length of the roof structure 102 and flank the first and second openings 118, 122. According to one aspect, each side rail 110, 112 can be defined by separate forward and rear side rail sections, the side rail 110 including a forward side rail section 110*a* and a rear side rail section 110*b* and the side rail 112 including a forward side rail section 112*a* and a rear side rail section 112*b*. It should be appreciated that the side rails 110, 112 can also provide structural support for the roof structure 102 along the first and second openings 118, 122. The forward side rail sections 110*a*, 112*b* of each of the respective side rails 110, 112 can include a guide rail groove (not shown) for accommodating at least one slider (not shown) of the tilt-and-slide mechanism which is operably connected to the first sunroof panel 126. As is well known, the at least one slider can include a front slider and a rear slider that slide in the longitudinal direction of the vehicle in the guide rail groove provided in the each side rail 110, 112. In FIG. 1, the first sunroof panel 126 is fully closed, and the at least one slider of each side rail 110, 112 is at a foremost position. From this state, rearward sliding movement of the at least one slider of each side rail 110, 112 causes the first sunroof panel 126 to move to the opened position overlapping the section 130 of the roof structure 102, which leaves the first opening 118 of the roof structure opened. It should be appreciated, however, that the first sunroof panel 126 can be fixed in the first opening 118.

A drainage assembly 140 is associated with the first opening 118 for receiving rainwater or washing water coming from between a peripheral edge of the first opening 118 and the first sunroof panel 126 and guiding the water away from the first opening 118. To direct water away from the first opening 118, a gutter (not shown) can be provided in a portion of the roof structure 102 which frames the first opening 118. The gutter can have a generally rectangular shape as a whole and can comprise a front side gutter portion, a left side gutter portion, a right side gutter, and a rear side gutter portion. Each of the front side gutter and the rear side gutter can have a central portion slightly raised relative to its opposite ends so that water is reliably guided from the front and rear side gutter portions to the left and right side gutter portions. Drain conduits are connected to the gutter (only a pair of rear laterally spaced drain conduits 146, 148 connected to the forward side rail sections 110*a*, 112*a* of the respective side rails 110, 112 is visible in FIG. 4). The drain conduits are in communication with drain openings located on a lower part of the vehicle body (not shown) via hollow portions provided in front pillars (not shown) and center pillars (not shown) of the vehicle body, and the water guided into the drain conduits is discharged out of the body from the drain openings. The drainage assembly 140 further includes a connecting conduit or drain tube 150 arranged as a connecting passage for connecting the rear drain conduits 146, 148. If a large quantity of rainwater is coming into the gutter when the vehicle is parked, for example, the water in either the left side gutter portion or the right side gutter portion can be fed through the drain tube 150 to the other of the left side gutter portion and right side gutter portion to be guided to its adjacent drain conduit 146, 148. Thus, the use of the drain tube 150 prevents water from overflowing from the left and right side gutter portions of the drainage assembly 140.

The panoramic sunroof assembly 100 further comprises a second sunroof panel 156 connected to the roof structure 102 for covering the second opening 122. In the depicted embodiment, the second sunroof panel 156 is defined by a large window which can be fixed (i.e., non movable) relative to the second opening 122. A sunshade assembly 160 is operably associated with the second sunroof panel 156. The sunshade assembly 160 generally includes a frame 162 separate from and mounted to the roof structure 102 and a sunshade panel 164 disposed under the second sunroof panel 156. When the sunshade panel 164 is closed, it covers the second opening 122 of the roof structure 102 to block light entering the second opening 122, and when it is opened, it is moved horizontally and rearward, and is accommodated in the roof structure 102. A drive mechanism 168 can be provided to move the sunshade panel 164 between its closed position and its opened position. It should be noted that the sunshade panel can be configured to be manually operated from an interior side.

Figure 2:
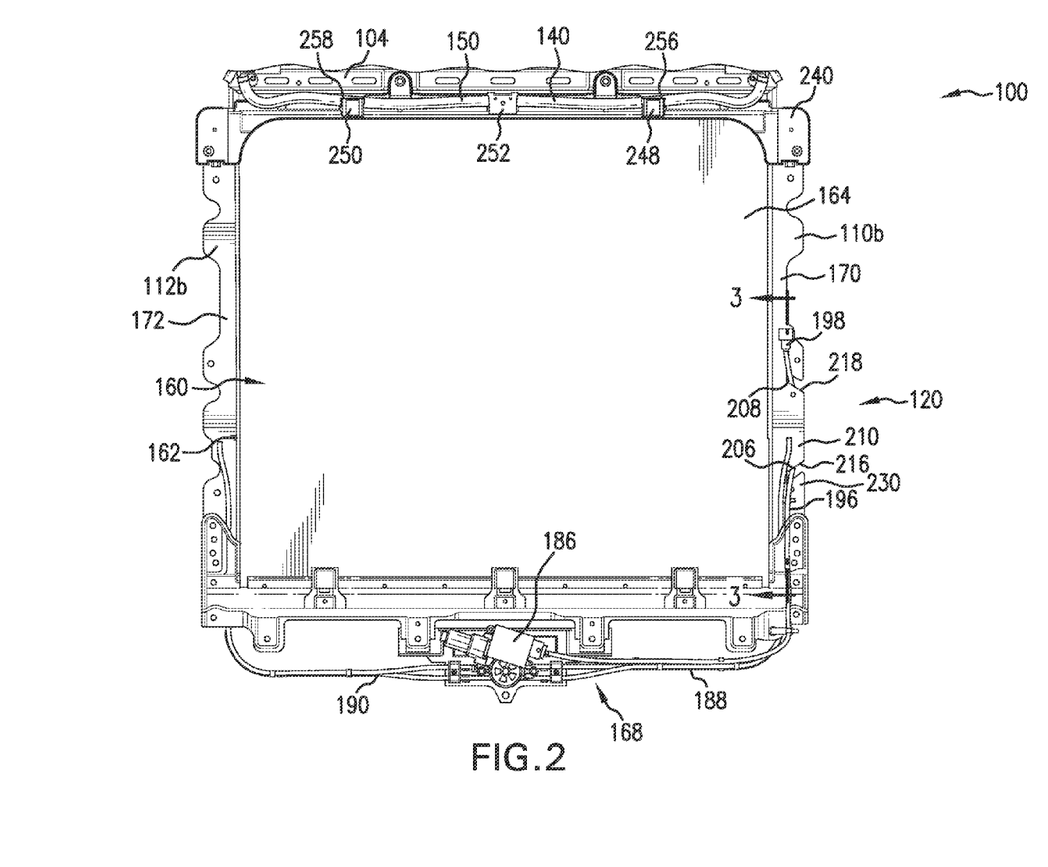
FIG. 2 is a bottom perspective view of a rear part of the panoramic sunroof assembly of FIG. 1.
Figure 3:
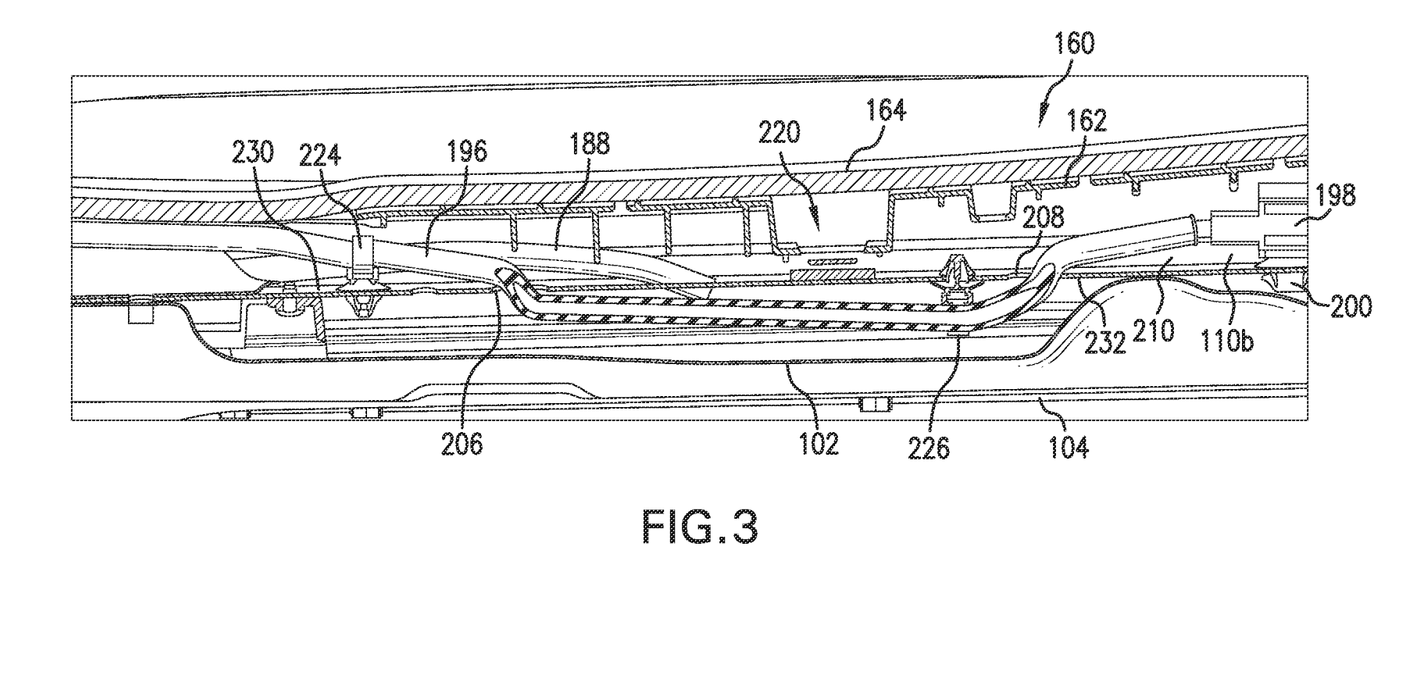
FIG. 3 is a cross-sectional view taken along line 3-3 of FIG. 2.
Figure 5:
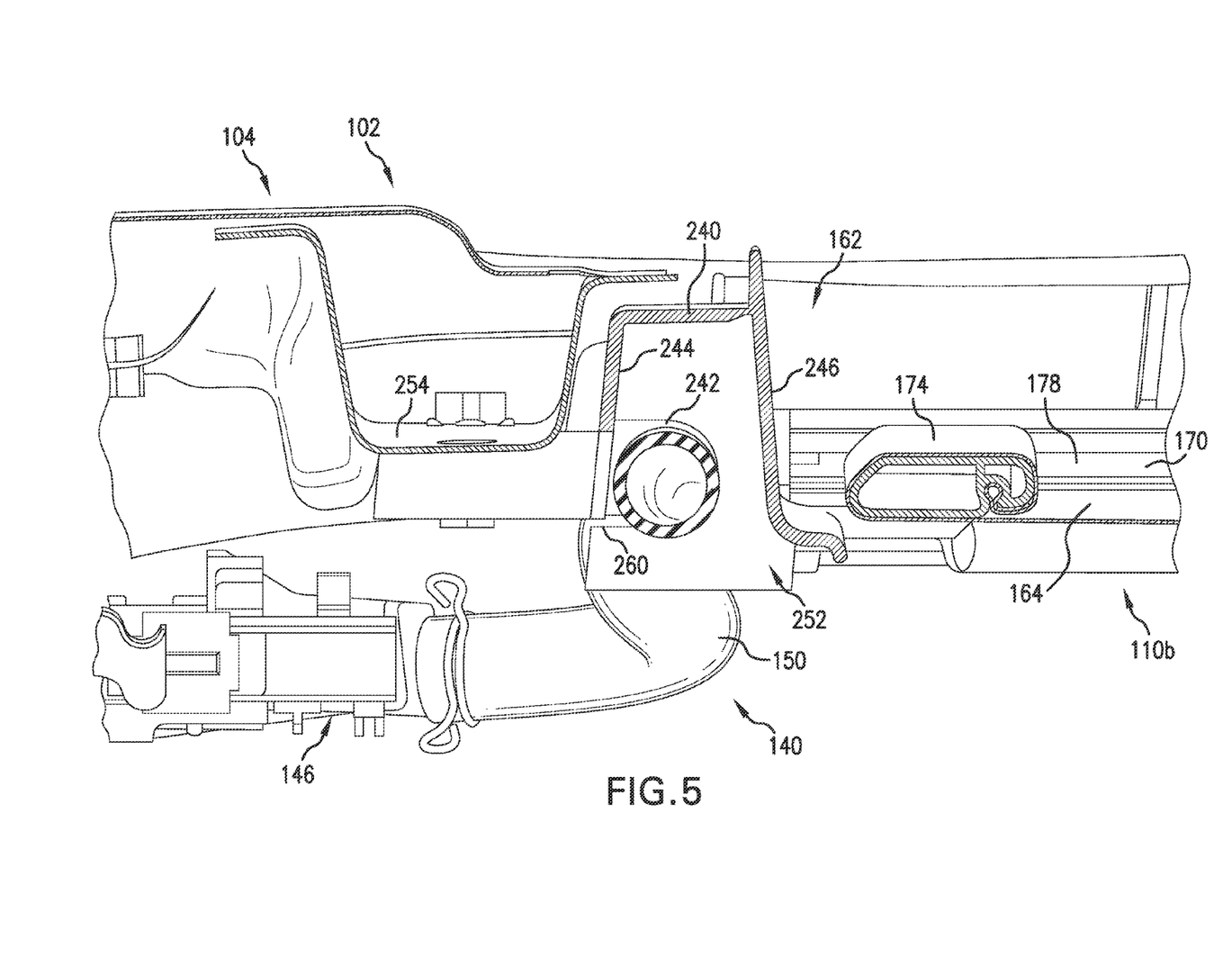
FIG. 5 is a cross-sectional view taken along line 5-5 of FIG. 4.

The frame 162 of the sunshade assembly 160 is provided with sunshade rails 170, 172 extending in the longitudinal direction of the vehicle which guide opening/closing of the sunshade panel 164. Each of the sunshade rails 170, 172 is disposed inward in a vehicle-width direction relative to the rear side rail sections 110*b*, 112*b* of the respective side rails 110, 112 as shown in FIG. 1, and can be symmetrical in a lateral direction. Further, it should be appreciated that the sunshade rails 170, 172 can be defined by the rear side rail sections 110*b*, 112*b* of the respective side rails 110, 112. As best depicted in FIGS. 1 and 5, the sunshade panel 164 is tensioned at its opposite sides by a guide strip 174. Opposite ends of the guide strip 174 are secured in channels or rail grooves (only groove 178 of sunshade rail 172 is shown) located in the sunshade rails 170, 172. It should be appreciated that the ends of the guide strip 174 can be mounted to sliders (not shown), and when both sliders slide along their respective sunshade rails 170, 172 in the longitudinal direction, the sunshade panel 164 is slid between the closed and opened positions. As illustrated in FIG. 1, the sunshade panel 164 is wound onto a winding reel 180 of the drive mechanism 168 mounted to the frame 162. The winding reel 180 includes a pair of rollers 182, 184 mechanically connected to a motor 186 of the drive mechanism 168 that assists in movement of the sunshade panel 164 between the closed and opened positions. With reference to FIGS. 2 and 3, cables 188, 190 associated with the rollers 182, 184 are connected to the opposite ends of the guide strip 174. By performing synchronous push-pull operation of the cables 188, 190 via the rollers of the winding wheel 180, the sunshade panel 164 opens and closes to selectively block light entering the second opening 122.

As illustrated in FIGS. 2 and 3, the drive mechanism 168 further includes a motor drive cord 196 having one end connected to the motor 186 and an opposite end connected to a harness 198 mounted to one of the side rails 110, 112. The motor drive cord 196 extends along the one side rail 110, 112, and the one side rail is configured to route the motor drive cord 196 both above and below the one side rail at a predetermined location on the one side rail. Particularly, the motor drive cord 196 extends along the rear side rail section 110*b* of the side rail 110 and the harness 198 is connected thereto via a fastener 200, which can be any type of mechanical fastening device commonly known in the art. A pair of longitudinally spaced slots 206, 208 extends through a mounting flange 210 of the rear side rail section 110*b* of the side rail 110, and each of the slots 206, 208 is sized to receive and retain therein the motor drive cord 196. According to one aspect, the pair of slots 206, 208 are angled or canted on the mounting flange 210 such that an open end 216, 218 of each respective slot 206, 208 extends toward one another. The pair of slots 206, 208 provided in the rear side rail section 110*b* of the side rail 110 allows the motor drive cord 196 to avoid crowded layout areas of the roof structure 102. By way of example, FIG. 3 depicts the motor drive cord 196 routed around an attachment point 220 between the roof structure 102 and the rear side rail section 110b of the side rail 110. The pair of slots 206, 208 also provides an attachment feature thereby eliminating the need for additional fasteners for mounting the motor drive cord 192 to the side rail 110. As shown, by use of the slots 206, 208, only a pair of fasteners 224, 226 is required to securely mount the motor drive cord 196 to the mounting flange 210. The first fastener 224 is located rearward of the slot 206 for securing the motor drive cord 196 to a first surface 230 of the mounting flange 210 and the second fastener 226 is located rearward of the slot 208 for securing the motor drive cord 196 to a second opposite surface 232 of the mounting flange 210. Further, it should be appreciated that the angle of each of the slots 206, 208 forces the motor drive cord 196 to stay in location on the mounting flange 210.

Figure 4:
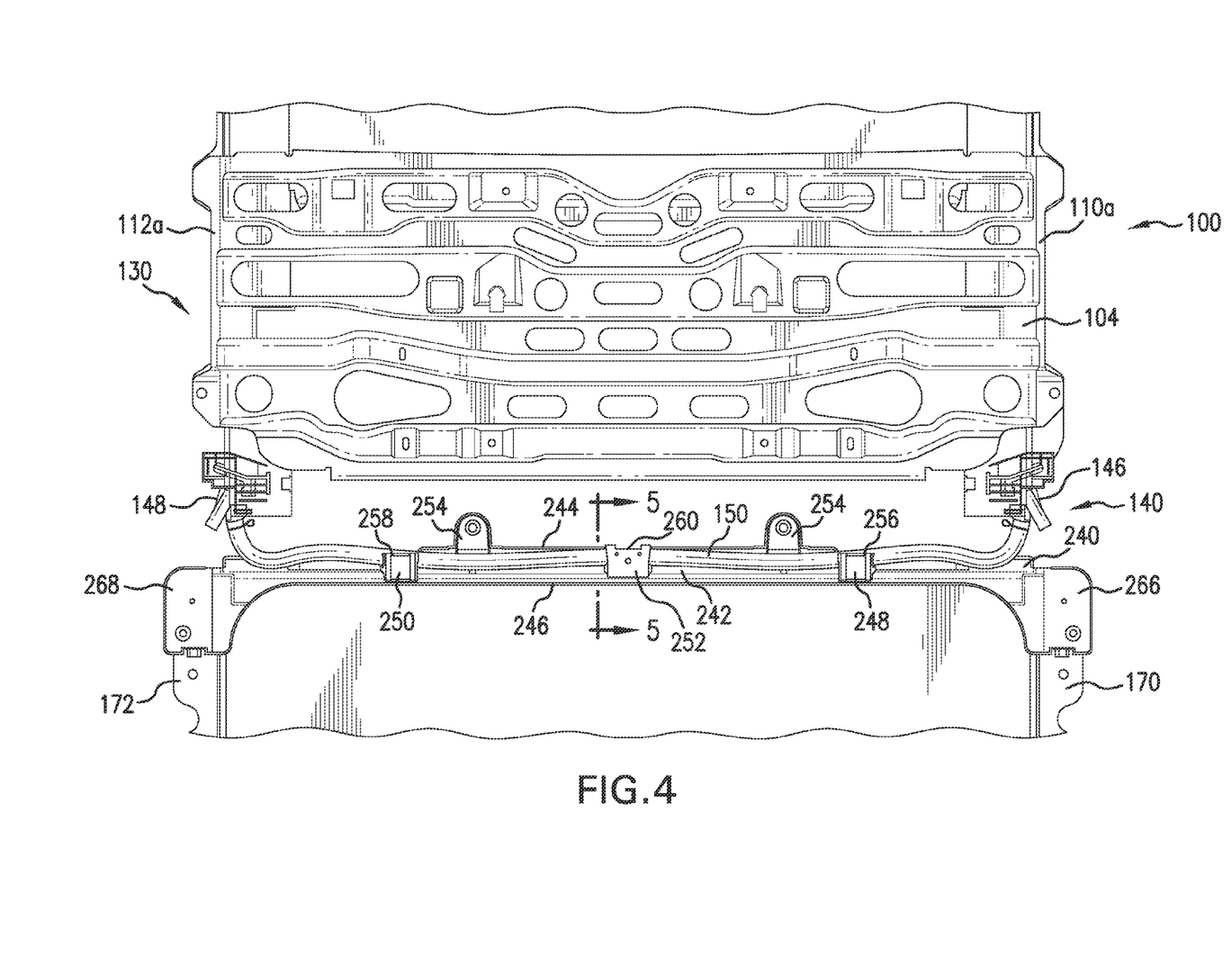
FIG. 4 is a bottom perspective view of a central part of the panoramic sunroof assembly of FIG. 1.

As depicted in to FIGS. 4 and 5, the frame 162 of the sunshade assembly 160 is configured to retain the drain tube 150 thereto to prevent damage to the drain tube 150 during install of the sunshade assembly 160 on the roof structure 102 due to the close proximity of the sunshade assembly 160 to the first sunroof panel 126, and to enable optimal daylight open size and position of the second opening 122. Particularly, the frame 162 includes a front frame part 240 which extends laterally between the rear side rail sections 110b, 112b of the side rails 110, 112. The front frame part 240 defines a channel 242 dimensioned to at least partially receive the drain tube 150. According to one aspect, the channel 242 of the front frame part 240 is defined by a pair of longitudinally spaced walls 244, 246 dimensioned to receive and retain the drain tube 150 within the channel 242. Further, the front frame part 240 includes a pair of laterally spaced first attachment members 248, 250 and a second attachment member 252, each attachment member configured to engage the drain tube 150 once positioned in the channel 242. As shown, the second attachment member 252 is centrally located on the front frame part 240. Each of the first attachment members 248, 250 and the second attachment member 252 can be generally C-shaped in cross-section having a respective open end portion 256, 258, 260 adapted to receive and retain the drain tube 150. The first and second attachment members 248, 250, 252 can be integrally formed with the front frame part 240; although, this is not required. The frame 162 of the sunshade assembly 160 further includes at least one front mount 254 extending from the front frame part 240 for connecting the frame 162 to the roof structure 102. As shown in FIG. 5, the drain tube 150 is secured to the front frame part 240 rearward of and at least partially below the at least one front mount 254.

Figure 6:
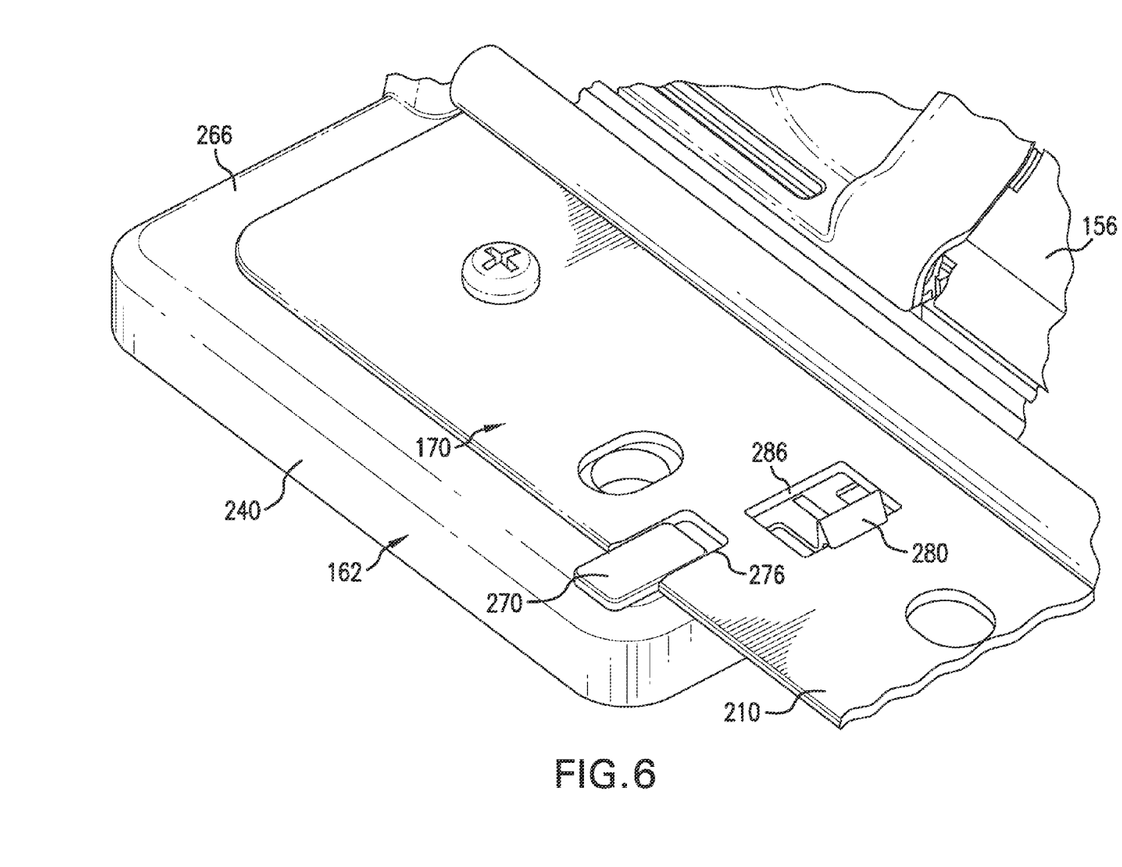
FIG. 6 is an enlarged view of the circled portion of FIG. 1.

With reference back to FIG. 1, the front frame part 240 the sunshade assembly frame 162 includes end portions 266, 268 connected to the respective rear side rail sections 110b, 112b of the side rails 110, 112, and the connection between the front frame part 240 and each side rail 110, 112 is configured to prevent longitudinal movement of the front frame part 240 relative to the side rails but allow lateral adjustment of the front frame part 240 relative to the side rails. According to the depicted embodiment, to allow for this lateral adjustment of the front frame part 240, located on the respective end portions 266, 268 of the front frame part are projections 270, 272. Each of the respective side rails 110, 112 includes a laterally extending cutout 276, 278. Cutout 276 is sized to slidably receive (in the lateral direction) the projection 270 and cutout 278 is sized to slidably receive (in the lateral direction) the projection 272. FIG. 6 depicts the end portion 266 of the front frame part 240 connected to the side rail 110. According to one aspect, each of the projection 270 and cutout 276 is generally rectangular shaped; although, alternative shapes are contemplated. The cutout 276 has a longitudinal dimension slightly greater than a longitudinal dimension of the projection 270 which allows for lateral movement, but also prevents longitudinal movement, of the projection 270 within the cutout 276. This engagement between the projections 270, 272 and the cutouts 276, 278 ensures a perpendicular arrangement between the side rails 110, 112 and the frame 162 while allowing adjustability in the lateral direction. It should be appreciated that the projection/cutout arrangement is by way of example only and that alternative manners to laterally adjust the sunshade assembly frame 162 relative to the side rails 110, 112 are contemplated. For example, the front frame part 240 can be provided with a fastener which is received in a slotted hole located in one of the side rails 110, 112.

The front frame part 240 further includes a pair of mounting tabs 280, 282 located inwardly of the respective projections 270, 272 for engaging the side rails 110, 112. In the depicted embodiment, each of the side rails 110, 112 includes a respective second cutout 286, 288 for receiving one of the mounting tabs 280, 282. Each second cutout is also dimensioned to allow lateral movement of the mounting tab received therein. By way of example, FIG. 6 depicts the mounting tab 280 received in the second cutout 286. The second cutout 286 has predetermined lateral dimension which allows the mounting tab 280 to laterally move within the second cutout 286 without inhibiting the lateral movement of the projection 270 within the cutout 276.

As is evident from the foregoing, the present disclosure generally relates to a panoramic sunroof assembly 100 including a sunshade assembly 160 mounted to a roof structure 102. The sunshade assembly 160 includes a sunshade panel 164 mounted to the roof structure 102 underneath a panoramic second sunroof panel 156. The sunshade panel 164 is tensioned at its opposite sides by a guide strip 174 which is trapped in rail grooves located in sunshade rails 170, 172. The sunshade rails 170, 172 can be defined in rear side rails sections 110b, 112b of the respective side rails 110, 112. Slots 206, 208 are also formed in a mounting flange 210 of one of the side rails 110, 112 to allow routing of a sunshade motor drive cord 196 above and below the one side rail. The angle of each slot 206, 208 forces the motor drive cord 196 to stay in location which eliminates the need for additional mounting fasteners. A front frame part 240 of a sunshade assembly frame 162 is configured to integrate a drain tube 150 of a drainage assembly 140 to prevent damage to the drain tube upon installation of the sunshade assembly 160 due to the close proximity of the sunshade assembly 160 to a first sunroof panel 126. Finally, each of the side rails 110, 112 can be provided with a cutout 276, 278 for receiving a respective projection 270, 272 provided on the front frame part 240 that permits sideways adjustability of the front frame part, for making each side rail 110, 112 perpendicular to the front frame part 240, and for adjusting sideway or lateral tension of the sunshade panel 164.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A panoramic sunroof assembly for a vehicle comprising:
   a roof structure including a pair of laterally spaced side rails fixed to the roof structure, the roof structure having a forward part defining a first opening and a rearward part defining a second opening;

a first sunroof panel slidably connected to the roof structure for covering the first opening;

a second sunroof panel fixedly connected to the roof structure for covering the second opening;

a sunshade assembly including a frame separate from and mounted to the roof structure and a sunshade panel slidably connected to the frame for selectively blocking light entering the second opening; and a drainage assembly associated with the first opening, the drainage assembly including a pair of laterally spaced drain conduits connected to the side rails and a drain tube interconnecting the drain conduits, wherein the frame of the sunshade assembly is includes a front frame part located forward of the second opening and configured to retain the drain tube thereto to prevent damage to the drain tube during install of the sunshade assembly on the roof structure.

2. The assembly of claim 1, wherein the front frame part defines a channel dimensioned to at least partially receive the drain tube.

3. The assembly of claim 2, wherein the front frame part includes a pair of laterally spaced first attachment members configured to engage the drain tube and retain the drain tube in the channel of the front frame part.

4. The assembly of claim 3, wherein the front frame part includes a second attachment member configured to engage the drain tube, the second attachment member being centrally located on the front frame part.

5. The assembly of claim 1, wherein the frame includes a front mount for connecting the frame to the roof structure, the drain tube being secured to the frame rearward of and at least partially below the front mount.

6. The assembly of claim 1, wherein the sunshade assembly further includes a drive mechanism for moving the sunshade panel between a closed position and an opened position, the drive mechanism including a motor drive cord extending along one of the side rails, the one side rail being configured to route the motor drive cord both above and below the one side rail at a predetermined location on the one side rail.

7. The assembly of claim 6, wherein the one side rail includes a pair of longitudinally spaced slots sized to receive and retain therein the motor drive cord.

8. The assembly of claim 7, wherein the pair of slots is angled toward one another.

9. The assembly of claim 7, wherein the pair of slots is located on a mounting flange of the one side rail.

10. The assembly of claim 7, wherein the pair of slots routes the motor drive cord around an attachment point between the one side rail and the roof structure.

11. A panoramic sunroof assembly for a vehicle comprising:

a roof structure including a pair of laterally spaced side rails fixed to the roof structure, the roof structure having a forward part defining a first opening and a rearward part defining a second opening;

a first sunroof panel slidably connected to the side rails of the roof structure for covering the first opening;

a second sunroof panel connected to the roof structure for covering the second opening; and a sunshade assembly including a frame mounted to the roof structure, a sunshade panel slidably connected to the frame for selectively blocking light entering the second opening, and a drive mechanism for moving the sunshade panel between a closed position and an opened position, the drive mechanism including a motor drive cord extending along one of the side rails, the one side rail including a pair of longitudinally spaced slots sized to receive and retain therein the motor drive cord, the slots allowing the motor drive cord to be routed both above and below the one side rail at a predetermined location on the one side rail, wherein the pair of slots routes the motor drive cord around an attachment point between the one side rail and the roof structure.

12. The assembly of claim 11, wherein the pair of slots is angled toward one another.

13. The assembly of claim 11, further including a drainage assembly associated with the first opening, the drainage assembly including a pair of laterally spaced drain conduits connected to the side rails and a drain tube interconnecting the drain conduits, the drain tube being secured to a front frame part of the sunshade assembly frame.

14. The assembly of claim 13, wherein the front frame part defines a channel dimensioned to at least partially receive the drain tube, the front frame part including laterally spaced attachment members configured to engage the drain tube and retain the drain tube in the channel of the front frame part.

15. A panoramic sunroof assembly for a vehicle comprising:

a roof structure including a pair of laterally spaced side rails fixed to the roof structure, the roof structure having a forward part defining a first opening and a rearward part defining a second opening;

a first sunroof panel slidably connected to the roof structure for covering the first opening;

a second sunroof panel connected to the roof structure for covering the second opening;

a sunshade assembly including a frame mounted to the roof structure and a sunshade panel slidably connected to the frame for selectively blocking light entering the second opening, the frame including a front frame part configured to at least partially secure thereto a drain tube of a drainage assembly associated with the first opening; and a drive mechanism for moving the sunshade panel between a closed position and an opened position, the drive mechanism including a motor drive cord extending along one of the side rails, the one side rail being configured to route the motor drive cord both above and below the one side rail at an attachment point between the one side rail and the roof structure, wherein the one side rail includes a pair of longitudinally spaced slots angled toward one another and sized to receive and retain therein the motor drive cord.

16. The assembly of claim 15, wherein the front frame part defines a channel dimensioned to at least partially receive the drain tube.

17. The assembly of claim 16, wherein the front frame part includes laterally spaced attachment members configured to engage the drain tube and retain the drain tube in the channel of the front frame part.

* * * * *